US012033151B2

(12) United States Patent
Newland et al.

(10) Patent No.: US 12,033,151 B2
(45) Date of Patent: *Jul. 9, 2024

(54) AUTHENTICATING TRANSACTIONS USING RISK SCORES DERIVED FROM DETAILED DEVICE INFORMATION

(71) Applicant: VISA INTERNATIONAL SERVICE ASSOCIATION, San Francisco, CA (US)

(72) Inventors: Karl Newland, Pacifica, CA (US); Douglas Fisher, Mountain View, CA (US); Craig O'Connell, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,965

(22) Filed: Jun. 22, 2021

(65) Prior Publication Data

US 2021/0319450 A1    Oct. 14, 2021

Related U.S. Application Data

(63) Continuation of application No. 15/572,770, filed as application No. PCT/US2016/031029 on May 5, 2016, now Pat. No. 11,074,585.

(Continued)

(51) Int. Cl.
*G06Q 20/40* (2012.01)
*G06Q 20/32* (2012.01)
(Continued)

(52) U.S. Cl.
CPC ....... *G06Q 20/4016* (2013.01); *G06Q 20/326* (2020.05); *G06Q 20/385* (2013.01);
(Continued)

(58) Field of Classification Search
CPC .. G06Q 20/4016; G06Q 20/32; G06Q 20/385; H04L 63/0853; H04L 63/0876; H04L 63/123

See application file for complete search history.

(56) References Cited

U.S. PATENT DOCUMENTS 10,043,182 B1 *   8/2018   Bharghavan ....... G06Q 20/4015
10,091,312 B1 *  10/2018   Khanwalkar ......... H04L 67/306
(Continued)

FOREIGN PATENT DOCUMENTS

CN        101072414       11/2007
CN        101523428        9/2009
(Continued)

OTHER PUBLICATIONS

Sun Microsystems, Inc., Sun Java(TM) System Directory Server 5.2 2005Q1 Technical Overview, 2005, chapter 2, retrieved from: https://docs.oracle.com/cd/E19396-01/817-7619/intro.html#:~:text= Directory%20Server%20provides%20a%20central,network% 20devices%20and%20manufactured%20parts. (Year: 2005).*

(Continued)

*Primary Examiner* — Daniel S Felten
*Assistant Examiner* — Douglas W Pinsky
(74) *Attorney, Agent, or Firm* — Kilpatrick Townsend & Stockton LLP

(57) ABSTRACT

One embodiment of the invention is directed to a method comprising, receiving an authentication request message for a transaction. The method further comprises determining that detailed device information is required to authenticate the transaction and generating a message including an identifier and a request for the detailed device information. The method further comprises retrieving the detailed device information from a remote server computer using the identifier and modifying the authentication request message to (Continued)

include the detailed device information. The method further comprises sending the modified authentication request message to an access control server computer. The method further comprises receiving an authentication response message from the access control server computer including a verification value for the transaction, where the verification value is generated based on a result of a risk analysis performed using the detailed device information.

15 Claims, 4 Drawing Sheets

Related U.S. Application Data

(60) Provisional application No. 62/159,142, filed on May 8, 2015.

(51) Int. Cl.
    *G06Q 20/38* (2012.01)
    *H04L 9/40* (2022.01)
    *H04L 29/06* (2006.01)

(52) U.S. Cl.
    CPC ...... *H04L 63/0853* (2013.01); *H04L 63/0876* (2013.01); *H04L 63/123* (2013.01)

(56) References Cited

U.S. PATENT DOCUMENTS

| | | | |
|---|---|---|---|
| 2003/0065805 A1* | 4/2003 | Barnes, Jr. | G06Q 30/0643 709/244 |
| 2010/0114776 A1* | 5/2010 | Weller | G06Q 20/4016 705/325 |
| 2010/0312703 A1* | 12/2010 | Kulpati | G06Q 20/32 705/44 |
| 2011/0191862 A1* | 8/2011 | Mandava | H04L 63/107 726/28 |
| 2011/0252456 A1 | 10/2011 | Hatakeyama | |
| 2012/0096557 A1 | 4/2012 | Britton et al. | |
| 2012/0209773 A1* | 8/2012 | Ranganathan | G06Q 20/3224 705/44 |
| 2014/0013442 A1 | 1/2014 | Ito et al. | |
| 2014/0040137 A1* | 2/2014 | Carlson | G06Q 20/382 705/44 |
| 2014/0189791 A1* | 7/2014 | Lindemann | H04L 63/20 726/3 |
| 2014/0279112 A1* | 9/2014 | Ulrich | G06Q 20/322 705/21 |
| 2014/0279477 A1* | 9/2014 | Sheets | G06Q 20/36 705/41 |
| 2014/0279523 A1* | 9/2014 | Lynam | G06Q 20/322 705/44 |
| 2014/0344155 A1* | 11/2014 | Liu | G06Q 20/322 705/44 |
| 2015/0120559 A1* | 4/2015 | Fisher | G06Q 20/3224 705/44 |
| 2015/0120560 A1* | 4/2015 | Fisher | G06Q 20/34 705/44 |
| 2016/0267476 A1* | 9/2016 | Beelen | G06Q 20/20 |
| 2018/0114224 A1 | 4/2018 | Newland et al. | |

FOREIGN PATENT DOCUMENTS

| | | |
|---|---|---|
| CN | 102063592 | 5/2011 |
| CN | 102110200 | 6/2011 |
| CN | 102467367 | 5/2012 |
| CN | 104468557 | 3/2015 |
| CN | 104580553 | 4/2015 |
| JP | 2004192353 | 7/2004 |
| KR | 20130059023 | 6/2013 |
| KR | 1020130059023 A * | 6/2013 |

OTHER PUBLICATIONS

A. Rial, "Privacy-Preserving E-Commerce Protocols," dissertation, University of Luxembourg, Faculty of Engineering Science, 2013, retrieved from: https://www.researchgate.net/profile/Alfredo-Rial/publication/297200348_Privacy-Preserving_E-Commerce_Protocols/links/56dd8dec08aedf2bf0c85bdb (Year: 2013).*
U.S. Appl. No. 15/572,770 , Final Office Action, Mailed On Oct. 3, 2019, 54 pages.
U.S. Appl. No. 15/572,770 , Final Office Action, Mailed On Jul. 31, 2020, 66 pages.
U.S. Appl. No. 15/572,770 , Non-Final Office Action, Mailed On May 29, 2019, 51 pages.
U.S. Appl. No. 15/572,770 , Non-Final Office Action, Mailed On Mar. 2, 2020, 53 pages.
U.S. Appl. No. 15/572,770 , Non-Final Office Action, Mailed On Nov. 27, 2020, 72 pages.
AU2016261212 , "First Examination Report", Apr. 7, 2021, 6 pages.
Application No. CN201680026923.1 , Office Action, Mailed On Apr. 6, 2021, 13 pages.
Application No. EP16793224.3 , Extended European Search Report, Mailed On Jan. 30, 2018, 10 pages.
Application No. EP16793224.3 , Office Action, Mailed On Sep. 28, 2018, 10 pages.
EP16793224.3 , "Summons to Attend Oral Proceedings", Dec. 18, 2020, 11 pages.
Guan , "Identification and Risk Analysis of Equipment and Public Systems", Mechanical and Electrical Information, Sep. 15, 2013, pp. 9-12—Machine Translation.
Application No. PCT/US2016/031029 , International Preliminary Report on Patentability, Mailed On Nov. 23, 2017, 10 pages.
Application No. PCT/US2016/031029 , International Search Report and Written Opinion, Mailed On Jul. 18, 2016, 13 pages.
Rial et al., "Privacy-Preserving E-commerce Protocols", Dissertation, University of Luxembourg, Faculty of Engineering Science, Online Available at: https://www.researchgate.net/profile/Alfredo-Rial/publication/297200348_Privacy-Preserving_ECommerce_Protocols/links/56dd8dec08aedf2bf0c85bdb, 2013, 316 pages.
Application No. SG11201708146V , Notice of Eligibility of Grant/ Examination Report, Mailed On Jun. 20, 2019, 6 pages.
Wang , "Application of Two-Factor Authentication in Network Information Security Management", Electric Power Informatization, Nov. 15, 2011, pp. 80-83_Abstract.
AU2016261212 , "Third Examination Report", Jan. 13, 2022, 4 pages.
AU2022202138 , "First Examination Report", May 26, 2023, 4 pages.
U.S. Appl. No. 17/901,541 , Non-Final Office Action, Mailed On Jul. 20, 2023, 25 pages.
AU2022202138 , "Second Examination Report", Sep. 8, 2023, 4 pages.
"Sun Java(TM) System Directory Server 5.2 2005Q1 Technical Overview", Chapter 2, Available Online at: https://docs.oracle.com/cd/E19396-01/817-7619/intro.html#:-:text=Directory%20Server%20provides%20a%20central,network%20devices%20and%20manufactured%20parts, 2005, 13 pages.
U.S. Appl. No. 17/901,541 , Final Office Action, Mailed On Dec. 7, 2023, 22 pages.
Application No. AU 2022202138, Third Office Action, Mailed on Dec. 18, 2023, 5 pages.

* cited by examiner

AUTHENTICATING TRANSACTIONS USING RISK SCORES DERIVED FROM DETAILED DEVICE INFORMATION

CROSS-REFERENCES TO RELATED APPLICATIONS

This application is a Continuation of U.S. patent application Ser. No. 15/572,770 filed Nov. 8, 2017, which is a 371 of International Patent Application No. PCT/US2016/031029, filed May 5, 2016, which claims the benefit of the filing date of U.S. Provisional Patent Application No. 62/159,142, filed on May 8, 2015, the disclosures of which is are herein incorporated by reference in their entireties for all purposes.

BACKGROUND

Currently users can engage in e-commerce transactions purchasing and ordering a variety of goods from online merchants utilizing web browsers from the ease of their home. The access to a new commerce channel for merchants and consumers alike has resulted in a number of benefits including better service and increased revenue. However, online merchants and consumers must engage in secure transactions to avoid sensitive information from being obtained (such as account numbers, personal information, or information identifying items purchased). Current methods to ensure security and efficiency include the use of secure communication channels from which two entities may provide sensitive information. However, the infrastructure, including hardware and software, required to set up new merchants or involve consumers can be costly with respect to time and money. Currently, as part of the transaction process, an authentication must be performed to ensure that the transaction is a valid and authentic transaction. This may require sending challenges to the user attempting to perform the transaction, requiring the user to contact the issuer to confirm a transaction, etc. This has some drawbacks as it may lead to abandonment of otherwise valid transactions when the customer experience is slowed and made inconvenient by excess challenges for valid transactions.

Embodiments of the invention address these and other problems, individually and collectively.

BRIEF SUMMARY

Embodiments of the invention are directed to systems and methods related to authenticating transactions using detailed portable device information to generate risk scores.

In current solutions, a secure authentication process may be performed for a transaction that generates risk scores based on transaction data and device data. However, secure authentication processes also have some drawbacks. One drawback is that in order for a transaction to be authenticated using the secure authentication program, the user may be required to have enrolled in the secure authentication program. Thus, if a transaction involves a user that is not enrolled in the secure authentication program, the secure authentication process may not be invoked.

Thus, there is a need for new and enhanced systems and methods of processing payment transactions that are more efficient and able to provide secure authentication-type services to all transactions.

One embodiment of the invention is directed to a method comprising, receiving, by a server computer, an authentication request message for a transaction. The method further comprises determining, by the server computer, that detailed device information is required to authenticate the transaction and generating a message including an identifier and a request for the detailed device information. The method further comprises retrieving, by the server computer, the detailed device information from a remote server computer using the identifier and modifying the authentication request message to include the detailed device information. The method further comprises sending, by the server computer, the modified authentication request message to an access control server computer. The method further comprises receiving, by the server computer, an authentication response message from the access control server computer including a verification value for the transaction, where the verification value is generated based on a result of a risk analysis performed using the detailed device information.

In some embodiments, the transaction includes utilizing a portable device. In embodiments, the portable device is configured to utilize a merchant mobile application and a processing network computer application.

In some embodiments, the authentication request message is provided by the processing network computer application of the portable device to the server computer. In embodiments, the transaction is initiated utilizing the merchant mobile application of the portable consume device.

In some embodiments, the message comprises user data, portable device data, and transaction data. In embodiments, the user data includes one or more of name of a user, an address for the user, an email address for the user, or a phone number for the user. In some embodiments, the portable device data identifies a type of device for the portable device, screen resolution for the portable device, and a device identifier for the portable device. In embodiments, the transaction data identifies item details included in the transaction, payment device data, and a payment account number of a user associated with the transaction.

In some embodiments, the remote server computer identifies the detailed device information to provide to the server computer based at least in part on a set of rules. The rules identify privacy requirements for the transaction that limits the detailed device information provided to the server computer.

In some embodiments, the method further comprises receiving, by the server computer, the authentication response message from the access control server computer absent the verification value for the transaction based at least in part on the risk analysis performed by the access control server utilizing the detailed device information. In some embodiments, a decline message is provided to a resource provider computer that indicates that the transaction is denied in response to the absence of the verification value for the transaction.

Embodiments of the invention are further directed to a server computer comprising a processor and memory. The memory can include instructions that, when executed with the processor, cause the server computer to perform operations for implementing any of the methods described herein.

Embodiments of the invention are further directed to a computer-implemented method comprising receiving an indication of a transaction initiated with a resource provider application of a portable device. The computer-implemented method further comprises generating an authentication request message for the transaction and providing the authentication request message to a directory server computer. The directory server computer is configured to determine that detailed device information for the portable device is required to authenticate the transaction. The computer-implemented method further comprises providing to a remote server computer the detailed device information for the portable device in response to a request from the remote server computer. The computer-implemented method further comprises receiving, from the directory server computer, an authentication response message that includes a verification value for the transaction. The verification value is generated by an access control server computer based on a result of a risk analysis performed using the detailed device information where the access control server computer transmits the verification value to the directory server computer. The computer-implemented method comprises transmitting the authentication response message and the verification value to an authorizing computer to authorize the transaction for a resource provider computer.

These and other embodiments of the invention are described in further detail below.

DETAILED DESCRIPTION

Figure 1:
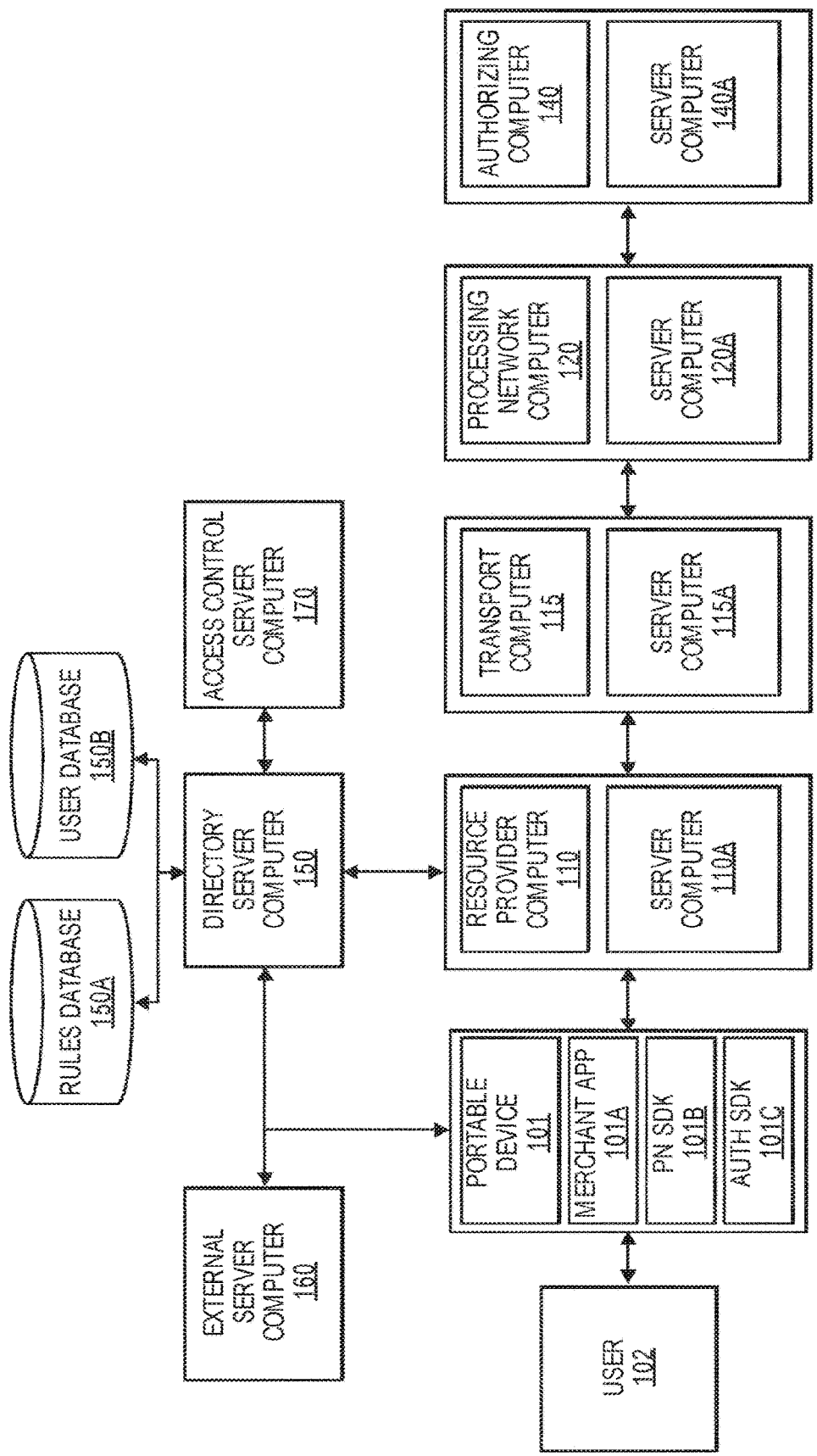
FIG. 1 shows a block diagram of a transaction processing system for processing transactions according to an embodiment of the present invention.

Embodiments of the present invention may be directed at authenticating transactions using detailed portable device information to generate risk scores.

In some embodiments, detailed portable device information for a portable device used in a transaction may be retrieved by a third party computer. The detailed portable device information may be associated with an authentication request message and used to enhance a risk analysis performed for the transaction.

In some embodiments, this process may be initiated by a processing network computer SDK that is stored on a memory in the portable device. When the user accesses a merchant application to perform a transaction, the merchant application may first invoke the processing network computer SDK prior to initiating the secure authentication process.

Embodiments of the present invention may be used in transaction processing systems or may use data generated during transaction processing through a transaction processing system. Such embodiments may involve transactions between users and merchants. The tokenized transaction amount may be used by the processing network computer to determine a transaction fee for processing the transaction on behalf of the merchant. Further, embodiments of the invention, as discussed herein, may be described as pertaining to financial transactions and payment systems. However, embodiments of the invention can also be used in other systems. For example, a transaction may be authorized for secure access of data or to a secure area.

Prior to discussing embodiments of the invention, descriptions of some terms may be helpful in understanding embodiments of the invention.

A "portable device" may comprise any suitable electronic device that may be operated by a user, which may also provide remote communication capabilities to a network. A "portable consumer device" may be an example of a "portable device." Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of portable devices include mobile phones (e.g. cellular phones), PDAs, tablet computers, net books, laptop computers, personal music players, hand-held specialized readers, etc. Further examples of portable devices include wearable devices, such as smart watches, fitness bands, ankle bracelets, rings, earrings, etc., as well as automobiles with remote communication capabilities. In some embodiments, a portable device can function as a payment device (e.g., a portable device can store and be able to transmit payment credentials for a transaction).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

An "application" may be computer code or other data stored on a computer readable medium (e.g., memory element or secure element) that may be executable by a processor to complete a task. Examples of an application include a resource provider application, a merchant application, or a processing network computer SDK. An application may include a mobile application. An application may be designed to streamline the purchase and payment process or the process for accessing a secure area or secure data. An application may enable a user to initiate a transaction with a resource provider or merchant and authorize the transaction.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or access. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments System) which processes authorization requests and a Base II system which performs clearing and settlement services. A payment processing network may be referred to as a processing network computer.

"Item details" may include information suitable for a transaction that involves an item or service. Examples of item details include price information, quantity information, a merchant identifier, or geographic location information.

I. Systems

FIG. 1 shows a block diagram of a transaction processing system for processing transactions according to an embodiment of the present invention. The system 100 includes a portable device 101, a resource provider computer 110, a transport computer 115, a processing network computer 120, an authorizing computer 140, a directory server computer 150, an external server computer 160, and an access control server computer 170. Each of these systems and computers may be in operative communication with each other. In some embodiments, the portable device 101 may be operated by a user 102.

Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The portable device 101 may be in any suitable form. For example, suitable user portable devices 101 may be handheld and compact so that they can fit into a user's pocket. Examples of portable devices 101 may include any device capable of accessing the Internet. Specific examples of portable devices 101 include cellular or wireless phones (e.g., smartphones), tablet phones, tablet computers, laptop computers, desktop computers, personal digital assistants (PDAs), pagers, portable computers, smart cards, and the like. Additional portable devices 101 may also include wearable devices, such as smart watches, fitness bands, ankle bracelets, rings, earrings, etc.

The portable device 101 may include a processor, memory, input/output devices, and a computer readable medium coupled to the processor. The computer readable medium may comprise code, executable by the processor for performing the functionality described below. In some embodiments, the portable device 101 may include a browser and/or applications (e.g., mobile applications, computer programs) stored in the memory and configured to retrieve, present, and send data across a communications network (e.g., the Internet).

In some embodiments, the portable device 101 may include at least a merchant application 101A, a processing network computer SDK ("PN SDK") 101B, and an authentication SDK ("Auth SDK") 101C, which may be stored in the memory of the portable device 101.

The resource provider computer 110 may be comprised of various modules that may be embodied by computer code, residing on computer readable media. The resource provider computer 110 may include a processor and a computer readable medium coupled to the processor, the computer readable medium comprising code, executable by the processor for performing the functionality described below. The resource provider computer 110 may be in any suitable form. Examples of the resource provider computer 110 may include a web server computer hosting a merchant Internet website or accessible by a merchant application 101A stored on the portable device 101. Additional examples of resource provider computers include any device capable of accessing the Internet, such as a personal computer, cellular or wireless phones, personal digital assistants (PDAs), tablet computers, and handheld specialized readers.

The transport computer 115 is typically a system associated with an entity (e.g., a bank) that has a business relationship with a particular merchant or other entity. The transport computer 115 may include a processor and a computer readable medium coupled to the processor, the computer readable medium comprising code, executable by the processor for performing the functionality described below. The transport computer 115 may be configured to route transaction authorization messages between the resource provider computer 110 and the processing network computer 120.

The processing network computer 120 may be a payment processing network computer, and may comprise a server computer 120A. The server computer 120A may include a processor and a computer readable medium coupled to the processor, the computer readable medium comprising code, executable by the processor. In some embodiments, the server computer 120A may be coupled to a database and may include any hardware, software, other logic, or combination of the preceding for servicing the requests from one or more client computers.

The processing network computer 120 may include data processing subsystems, networks, and operations used to support and deliver authorization services, exception file services, and clearing and settlement services. An exemplary processing network computer 120 may include VisaNet™. Networks that include VisaNet™ are able to process credit card transactions, debit card transactions, and other types of commercial transactions. VisaNet™, in particular, includes an integrated payments system that processes authorization requests and a Base II system that performs clearing and settlement services. The processing network computer 120 may use any suitable wired or wireless network, including the Internet.

An authorizing computer 140 is typically associated with a business entity (e.g., a bank). The authorizing computer 140 may comprise a server computer 140A. The server computer 140A may include a processor and a computer readable medium coupled to the processor, the computer readable medium comprising code, executable by the processor. In some embodiments, the authorizing computer 140 may communicate with the processing network computer 120 to provide authentication processes and account information associated with an account of the user 102. The authorizing computer 140 may maintain financial accounts for the user 102, and can issue payment devices, such as a credit or debit card to the user 102.

The directory server computer 150 may be a server computer configured to route messages from the portable device 101 and/or the resource provider computer 110 to the access control server computer 170, as well as messages from the access control server 170 to the portable device 101 and/or the resource provider computer 110. In some embodiments, the directory server computer 150 may be operated by the processing network computer 120. In some embodiments, the directory server computer 150 may include any hardware, software, other logic, or combination of the preceding for servicing the requests from one or more client computers.

In some embodiments, the directory server computer 150 may be coupled to one or more databases, such as a rules database 150A and a user database 150B. In some embodiments, the rule database 150A may store rules related to authentication and device data that may be retrieved to perform authentication (e.g., privacy data or restrictions). For example, the rule database 150A may store restrictions on the collection of user and portable device data based on country. In some embodiments, the user database 150B may store data associated with a user 102, including account data (e.g., account numbers) and user personal data (e.g., name, address, phone number, email address). In some embodiments, the user database 150B may be accessed with a user's email address or phone number to retrieve one or more account numbers associated with the user.

The access control server 170 may comprise a server computer that may be configured to conduct authentication and authorization processes. The access control server 170 may be associated with an issuer, which can be any bank that issues and maintains a financial account for a cardholder. The access control server 170 may validate (or authenticate) passwords, PIN numbers or challenge responses associated with the user, and an account associated with the user. The access control server 170 may use the PAN, computing device data, payment device data, geolocation data, consumer data, transaction data, account data, or other comparable data, in order to authenticate the user and PAN. In some embodiments, at the time of a transaction, the access control server 170 may further perform user authentication, and may provide digitally signed responses, including a CAVV, to the merchant application 101 stored on the portable device 101 through the directory server computer 150. In other embodiments, the access control server 170 may send responses back directly to the portable device 101. In some embodiments, the functions of the access control server computer 170 may be performed by the processing network computer 120.

Some embodiments may also include the external server computer 160. The external server computer 160 may include a processor and a computer readable medium coupled to the processor, the computer readable medium comprising code, executable by the processor. In some embodiments, the external server computer 160 may include any hardware, software, other logic, or combination of the preceding for servicing the requests from one or more client computers. In some embodiments, the external server computer 160 may be configured to retrieve device data from the portable device 101. In such embodiments, the retrieved device data may then be associated with a transaction as part of a risk analysis.

In embodiments of the present invention, a server computer can be a powerful computer or a cluster of computers. For example, the server computer can be a large mainframe, a minicomputer cluster, or a group of servers functioning as a unit. In one example, the server computer may be a database server coupled to a Web server. The components 101, 110, 115, 120, 140, 150, 160, and 170 may all be in operative communication with each other through any suitable communication channel or communications network. Suitable communications networks may be any one and/or the combination of the following: a direct interconnection; the Internet; a Local Area Network (LAN); a Metropolitan Area Network (MAN); and Operating Missions as Nodes on the Internet (OMNI); a secured customer connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using secure communications protocols such as, but not limited to, File Transfer Protocol (FTP); HyperText Transfer Protocol (HTTP); Secure Hypertext Transfer Protocol (HTTPS); Secure Socket Layer (SSL); ISO (e.g., ISO 8583) and/or the like.

The resource provider computer 110 may be associated with a resource provider. The resource provider may engage in transactions, sell goods or services, or provide access to goods, services, data, or events to a user. The resource provider computer 110 may provide access to service such as cash deposit/withdrawal, secure access, secure data access, etc. The resource provider may accept multiple forms of payment (e.g., the portable device 101) and may use multiple tools to conduct different types of transactions. The resource provider may also sell goods and/or services via a website or an application and may accept payments over the internet. The processing network computer 120 may be disposed between the transport computer 115 and authorizing computer 140.

The processing network computer 120 may include data processing subsystems, networks, and operations used to support and deliver authorization services, exception file services, and clearing and settlement services. For example, the processing network computer 120 may comprise a server coupled to a network interface (e.g., by an external communication interface), and databases of information. The processing network computer 120 may be representative of a transaction processing network. An exemplary transaction processing network may include VisaNet™. Transaction processing network such as VisaNet™ are able to process credit card transactions, debit card transactions, and other types of commercial transactions. VisaNet™, in particular, includes a VIP system (Visa Integrated Payments System) which processes authorization requests and a Base II system which performs clearing and settlement services. The processing network computer 120 may use any suitable wired or wireless network, including the Internet.

The authorizing computer 140 may issue and manage a payment account and an associated payment device such as portable device 101. The authorizing computer 140 may be able to authorize transactions that involve the payment account. Before authorizing a transaction, the authorizing computer 140 may authenticate payment credentials received in the authorization request and check that there is available credit or funds in an associated payment account. If the authorizing computer 140 receives an authorization request that includes a payment token, the authorizing computer 140 may be able to de-tokenize the payment token in order to obtain the associated payment credentials.

II. Methods

A. Authentication Using a Secure Authentication Process

Figure 2:
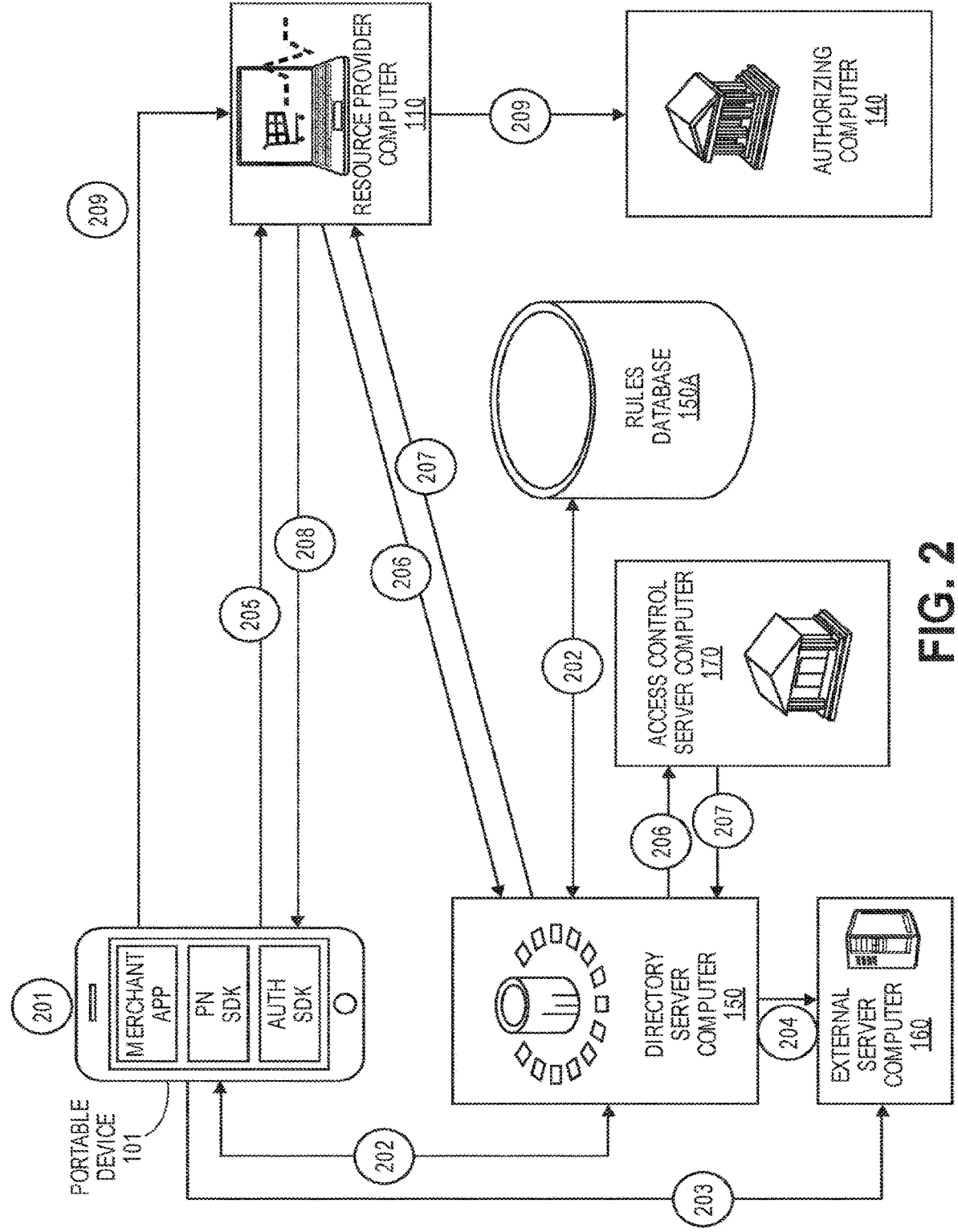
FIG. 2 shows a flow diagram depicting processing transactions using detailed device information according to an embodiment of the present invention.

FIG. 2 shows a flow diagram depicting processing transactions using detailed device information according to an embodiment of the present invention. Additional methods and processes may be included within these methods and may be recognized by one of ordinary skill in the art, in light of the description below. Further, in some embodiments of the present invention, the described methods may be combined, mixed, and matched, as one of ordinary skill would recognize. In the embodiment described below, the authentication request message may be authentication for a payment transaction. In other embodiments, among other examples, the authentication request message may be a request to authenticate a user or authorize an access transaction.

At step 201, the user 102 performs a payment transaction with a merchant associated with a resource provider computer 110. In some embodiment, the user 102 may perform the payment transaction using a portable device 101. In some embodiments, the user 102 may access a merchant mobile application 101A stored on the portable device 101 in order to initiate the payment transaction. The merchant mobile application 101A may be associated with the merchant operating the resource provider computer 110. When the user 102 has selected goods or services via the mobile application, the user 102 may proceed to a checkout process for the transaction. For example, the user 102 may select a "Buy" or "Checkout" option presented on a display of the portable device 101. In other embodiments, the user 102 may swipe or pass the portable device 101 by a merchant access device to initiate the payment transaction.

At step 202, as part of initiating the payment transaction, the merchant application 101A may invoke or access a processing network computer SDK ("PN SDK") 101B. The PN SDK 101B may generate and send a transaction message. The transaction message may include user data, portable device data, and transaction data. The transaction message may be sent to a directory server computer 150. The directory server computer 150 may evaluate the transaction message to determine whether portable device information is required for the payment transaction. In some embodiments, the directory server computer 150 may access a rules database 150A to determine privacy requirements that may exist for the payment transaction. For example, country A may allow the retrieval of the IP address of the portable device 101, while country B may not allow the retrieval of the IP address of the portable device 101.

The data sent in the transaction message may include user computing device data (e.g., device type, screen resolution, device identifier), user data (e.g., user name, user address data, user email address, user phone number), and transaction data (e.g., shopping cart data, payment device data, payment account number), and/or other comparable data.

In some embodiments, the directory server computer 150 may generate a message indicating whether an external server computer 160 should be accessed by the PN SDK in order to retrieve additional portable device information from the portable device. In such embodiments, directory server computer 150 may generate a session identifier (e.g., a transaction identifier), which may be sent in the message and stored by the directory server computer 150. In embodiments, the session identifier may include an alpha numeric string that is unique to the transaction or identification purposes. The session identifier may include a time stamp that corresponds to the transaction or any other suitable information that can be utilized to uniquely identify the transaction (such as a numeric value or code). In some embodiments, the message may also include the privacy requirements for the transaction retrieved from the rules database 150A.

At step 203, the PN SDK 101B may access the external server computer 160 to allow the external server computer 160 to access and retrieve detailed portable device information from the portable device 101. In such embodiments, the PN SDK 101B may transmit the session identifier generated by the directory server computer 150 to the external server computer 160. In some embodiments, the privacy requirements for the transaction retrieved from the rules database 150A may limit the portable device information that may be retrieved by the external server computer 160. The external server computer 160 may store the detailed portable device information and associate the data with the session identifier.

The detailed portable device information may include operating system data, browser data, mobile application data, geo-location data (IP address, country based on IP location), language data, JavaScript® options, Flash options, cookies options, etc.

At step 204, the directory server computer 150 may access the external server computer 160 using the session identifier. The directory server computer 150 may provide the session identifier to the external server computer 160. The external server computer 160 may retrieve the detailed portable device information associated with the session identifier and transmit the detailed portable device information to the directory server computer 150. In some embodiments, the external server computer 160 may send only the data authorized based on the privacy requirements for the transaction and retain any additional data. In other embodiments, the external server computer 160 may only have retrieved the detailed portable device information that is allowed based on the privacy requirements for the transaction.

At step 205, an authentication request message ("AReq") is transmitted by the merchant application 101A on the portable device 101 to the resource provider computer 110 as part of a secure authentication process. In embodiments, the merchant application 101A may be an example of a resource provider application and/or application that is utilized to streamline a transaction process. The authentication request message may request an authentication process be performed for a user, a user computing device, or a payment device.

At step 206, the resource provider computer 110 may send the authentication request message to the directory server computer 150. The directory server computer 150 may use the PAN, transaction date, transaction amount, IP address of the portable device 101, or other transaction-related data in the authentication request message to match the authentication request message to the data sent to the directory server computer 150 by the PN SDK 101B (in step 202 above).

In some embodiments, the directory server computer 150 may modify the authentication request message to include the detailed portable device information retrieved from the external server computer 160. In some embodiments, the directory server computer 150 may append the detailed portable device information to the authentication request message in a message extension.

The directory server computer 150 may then route the modified authentication request message to an appropriate access control server computer 170 associated with the transaction based on payment data (e.g., an account number). For example, the directory server computer 150 may evaluate the data in the authentication request message and search for an account range that includes a bank identification number ("BIN") or personal account number ("PAN") received in the authentication request message.

At step 207, the access control server computer 170 may use the data in the authentication request message and the detailed portable device information from the external server computer 160 to perform a risk analysis for the transaction. The access control server computer 170 may then generate an authentication response message indicating the result of the risk analysis. For example, when the risk analysis indicates that there is a low risk, the access control server computer 170 may generate a card authentication verification value ("CAVV") that may be used in an authorization process for the transaction. The CAVV may be included in the authentication response message.

In some embodiments, when the risk analysis indicates that there is a high risk, the access control server computer 170 may not generate the CAVV and may generate a message indicating that the transaction has not been authenticated and should be declined and/or terminated. The authentication response message may then be sent back to the resource provider computer 110 via the directory server computer 150.

At step 208, based on the decision provided in the authentication response message received from the access control server computer 170, the resource provider computer 110 may indicate that the authentication processing has been completed (either successfully or unsuccessfully). Based on the result of the authentication process, the resource provider computer 110 may proceed to the authorization process for the transaction, or may end the transaction.

At step 209, the authorization process is initiated by sending an authorization request message to the resource provider computer 110 from the merchant application 101A. The authorization request message may include the CAVV generated by the access control server computer 170 for the transaction. In some embodiments, the resource provider computer 110 may include the session identifier in the authorization request message to enable matching to the detailed portable device information. In other embodiments, the detailed portable device information may be sent with the authorization request message.

The authorization request message may be sent to an authorizing computer 140 through a transport computer 115 not pictured) associated with the merchant, and through the processing network computer 120 (not pictured). Once the transaction has been authorized by the authorizing computer 140, the resource provider computer 110 may finalize the transaction by providing goods or services to the user.

At a later time, a clearing and settlement process for the transaction may be conducted. The clearing and settlement process may include a process of reconciling the transaction. A clearing process is a process of exchanging financial details between the authorizing computer 140 and the transport computer 115 to facilitate posting to an account and reconciliation of the user's settlement position. Settlement involves the delivery of securities from one account (e.g., a user account at an issuing bank) to another account (e.g., a merchant account at an acquiring bank). In some embodiments, clearing and settlement can occur simultaneously. In some embodiments, the settlement process can be conducted using standard financial transaction messaging formats.

In some embodiments, the clearing and settlement process may be performed once the transaction has been completed, or may be sent in a batch by the resource provider computer 110 at the end of the business day or at designated times.

B. Authentication Using a Lite Secure Authentication Process

Figure 3:
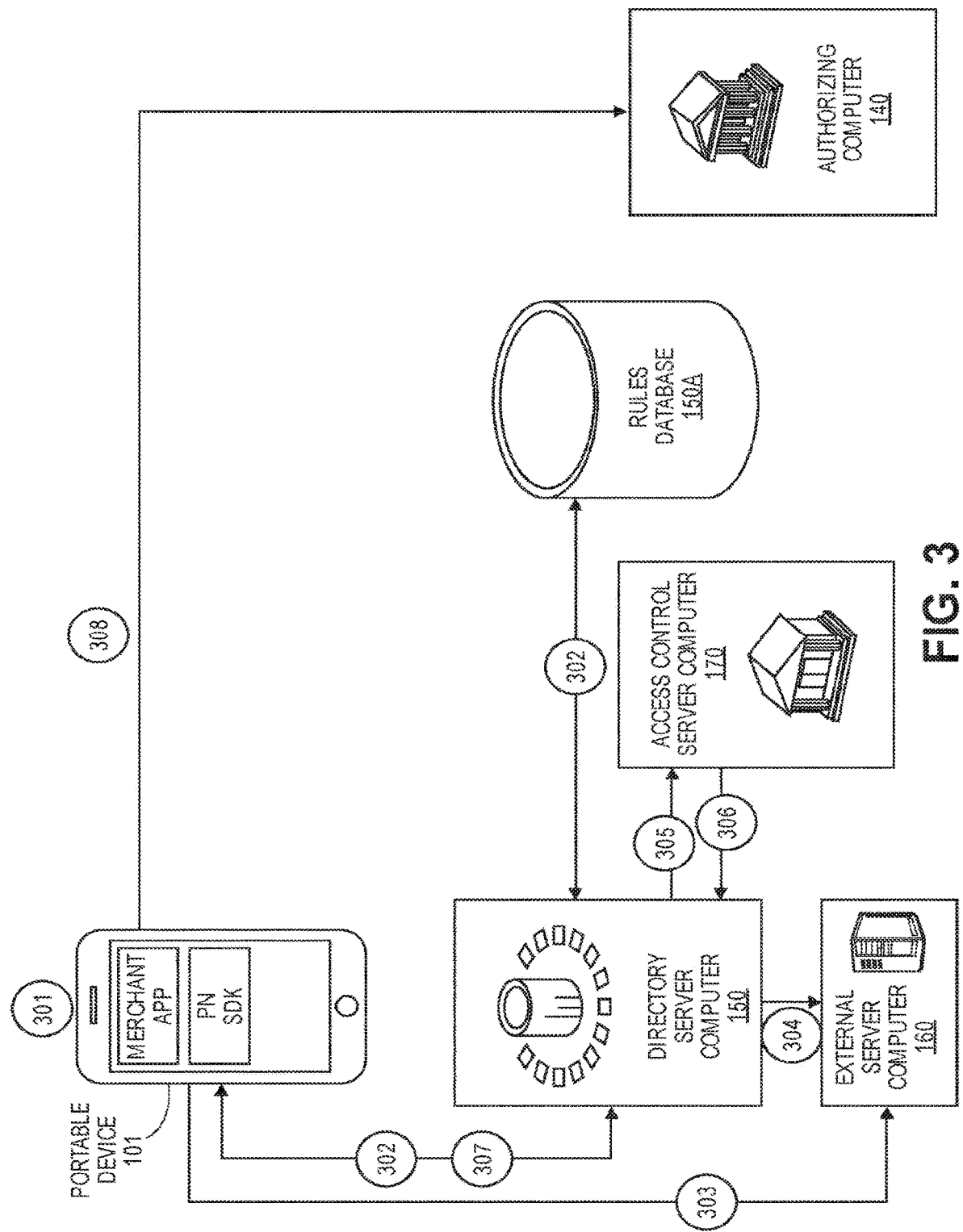
FIG. 3 shows a flow diagram depicting an alternative method of processing transactions using detailed device information according to an embodiment of the present invention.

FIG. 3 shows a flow diagram depicting an alternative method of processing transactions using detailed device information according to an embodiment of the present invention. In the embodiment depicted in FIG. 3, the authentication process may be performed without sending an authentication request message through the merchant.

As depicted in FIG. 3, steps 301-304 proceed as described above with respect to steps 201-204 of FIG. 2.

In step 305, the directory server computer 150 may send the authentication request message to the access control server computer 170. In some embodiments, the directory server computer 150 may modify the authentication request message to include the detailed portable device information retrieved from the external server computer 160. In some embodiments, the directory server computer 150 may append the detailed portable device information to the authentication request message in a message extension.

In step 306, the access control server computer 170 may use the data in the authentication request message and the detailed portable device information from the external server computer 160 to perform a risk analysis for the transaction. The access control server computer 170 may then generate an authentication response message indicating the result of the risk analysis. For example, when the risk analysis indicates that there is a low risk, the access control server computer 170 may generate a card authentication verification value ("CAVV") that may be used in an authorization process for the transaction. The CAVV may be included in the authentication response message.

In some embodiments, when the risk analysis indicates that there is a high risk, the access control server computer 170 may not generate the CAVV and may generate a message indicating that the transaction has not been authenticated and should be declined and/or terminated. The authentication response message may then be sent back to the directory server computer 150.

In step 307, the directory server computer may send the authentication response message back to the PN SDK 101B, which may then provide the result of the authentication process, including the generated CAVV to the merchant application 101A.

In step 308, the authorization process is initiated by sending an authorization request message to the resource provider computer 110 (not pictured) from the merchant application 101A. The authorization request message may include the CAVV generated by the access control server computer 170 for the transaction. In some embodiments, the resource provider computer 110 knot pictured) may include the session identifier in the authorization request message to enable matching to the detailed portable device information. In other embodiments, the detailed portable device information may be sent with the authorization request message.

The authorization request message may be sent to an authorizing computer 140 through an transport computer 115 knot pictured) associated with the merchant, and through the processing network computer 120 (not pictured). Once the transaction has been authorized by the authorizing computer 140, the resource provider computer 110 may finalize the transaction by providing goods or services to the user.

At a later time, a clearing and settlement process for the transaction may be conducted. The clearing and settlement process may include a process of reconciling the transaction. A clearing process is a process of exchanging financial details between the authorizing computer 140 and the transport computer 115 to facilitate posting to an account and reconciliation of the user's settlement position. Settlement involves the delivery of securities from one account (e.g., a user account at an issuing bank) to another account (e.g., a merchant account at an acquiring bank). In some embodiments, clearing and settlement can occur simultaneously. In some embodiments, the settlement process can be conducted using standard financial transaction messaging formats.

In some embodiments, the clearing and settlement process may be performed once the transaction has been completed, or may be sent in a batch by the resource provider computer 110 at the end of the business day or at designated times.

C. Authentication Using an Alias

Figure 4:
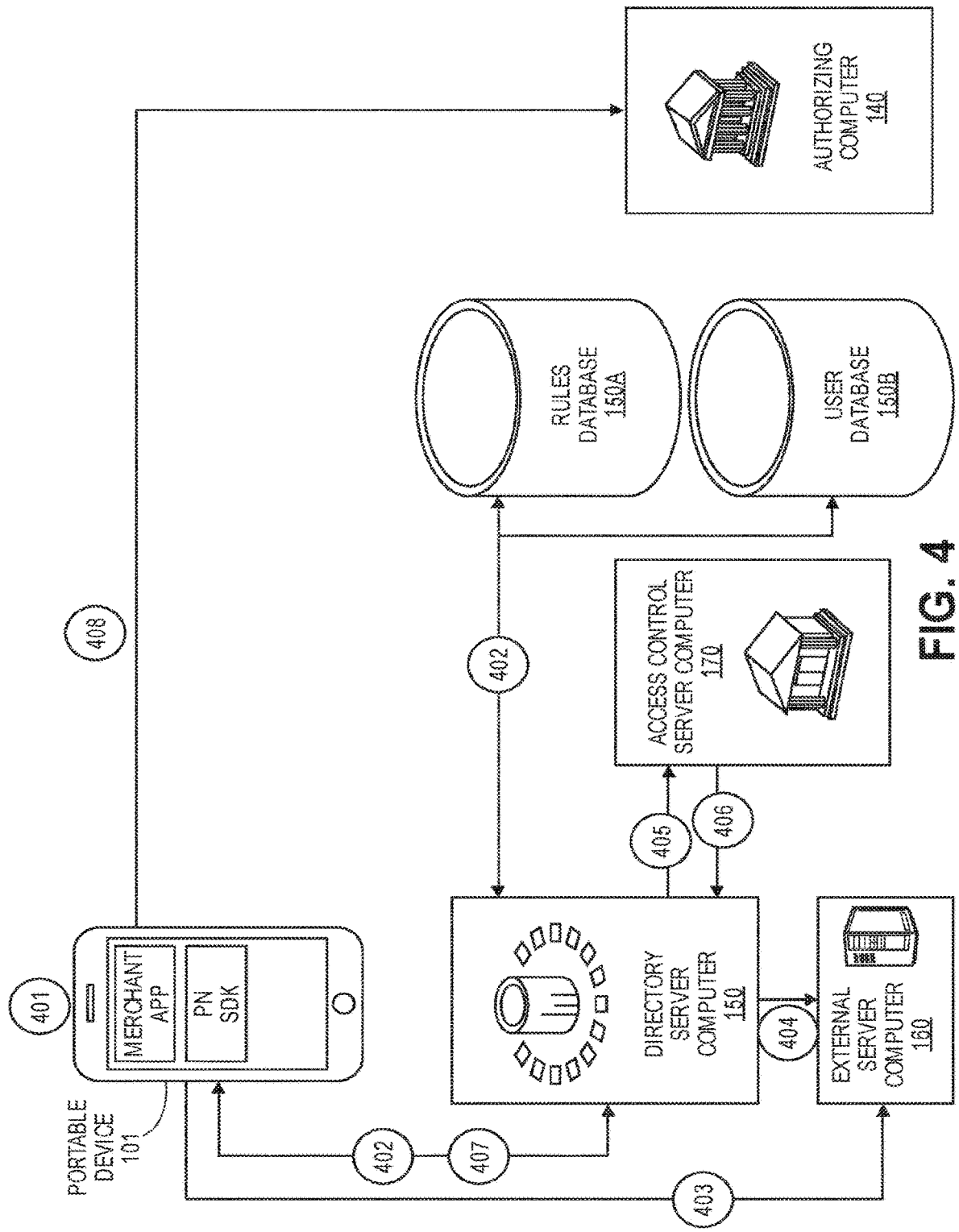
FIG. 4 shows a flow diagram depicting an alternative method of processing transactions using detailed device information according to an embodiment of the present invention.

FIG. 4 shows a flow diagram depicting an alternative method of processing transactions using detailed device information according to an embodiment of the present invention. In the embodiment depicted in FIG. 4, the authentication process may be performed without sending an authentication request message through the merchant using a secure authentication process. In this embodiment, the authentication request message may include a user phone number, email address or other non-payment account data in place of the user's account number.

At step 401, the user 102 performs a payment transaction with a merchant associated with a resource provider computer 110. In some embodiment, the user 102 may perform the payment transaction using a portable device 101. In some embodiments, the user 102 may access a merchant mobile application 101A stored on the portable device 101 in order to initiate the payment transaction. The merchant mobile application 101A may be associated with the merchant operating the resource provider computer 110. When the user 102 has selected goods or services via the mobile application, the user 102 may proceed to a checkout process for the transaction. For example, the user 102 may select a "Buy" or "Checkout" option presented on a display of the portable device 101. The user may provide their phone number, email address, or other unique identifier to the merchant as part of the transaction process.

At step 402, as part of initiating the payment transaction, the merchant application 101A may invoke or access a processing network computer SDK ("PN SDK") 101B. The PN SDK 101B may generate and send a transaction message. The transaction message may include user data, portable device data, and transaction data. The transaction message may be sent to a directory server computer 150. The directory server computer 150 may evaluate the transaction message to determine whether portable device information is required for the payment transaction. In some embodiments, the directory server computer 150 may access a rules database 150A to determine privacy requirements that may exist for the payment transaction.

In some embodiments, the directory server computer 150 may access a user database 150B to determine account data for the user. For example, the directory server computer 150 may query the user database 150B with the user email address and/or phone number provided in the authentication request message. The user email address and/or phone number may be associated with a user profile stored in the user database 150B. The user profile may include account data (e.g., account number, expiration date, transaction limits) associated with an account of the user. In such embodiments, the account number for the account may be retrieved and used to modify the authentication request message. In some embodiments, the user email address or phone number may be replaced with the account number. In other embodiments, the account number may be appended to the authentication request message or inserted into a field within the authentication request message.

In some embodiments, when the email address or phone number do not match a user profile stored in the user database 150B, the authentication request may be declined.

The data sent in the transaction message may include user computing device data (e.g., device type, screen resolution, device identifier), user data (e.g., user name, user address data, user email address, user phone number), and transaction data (e.g., shopping cart data, payment device data, payment account number), and/or other comparable data.

In some embodiments, the directory server computer 150 may generate a message indicating whether an external server computer 160 should be accessed by the PN SDK in order to retrieve additional portable device information from the portable device. In such embodiments, directory server computer 150 may generate a session identifier (e.g., a transaction identifier), which may be sent in the message and stored by the directory server computer 150. In some embodiments, the message may also include the privacy requirements for the transaction retrieved from the rules database 150A.

At step 403, the PN SDK 101B may access the external server computer 160 to allow the external server computer 160 to access and retrieve detailed portable device information from the portable device 101. In such embodiments, the PN SDK 101B may transmit the session identifier generated by the directory server computer 150 to the external server computer 160. In some embodiments, the privacy requirements for the transaction retrieved from the rules database 150A may limit the portable device information that may be retrieved by the external server computer 160. The external server computer 160 may store the detailed portable device information and associate the data with the session identifier.

The detailed portable device information may include operating system data, browser data, mobile application data, geo-location data (IP address, country based on IP location), language data, JavaScript® options, Flash options, cookies options, etc.

At step 404, the directory server computer 150 may access the external server computer 160 using the session identifier. The directory server computer 150 may provide the session identifier to the external server computer 160. The external server computer 160 may retrieve the detailed portable device information associated with the session identifier and transmit the detailed portable device information to the directory server computer 150. In some embodiments, the external server computer 160 may send only the data authorized based on the privacy requirements for the transaction and retain any additional data. In other embodiments, the external server computer 160 may only have retrieved the detailed portable device information that is allowed based on the privacy requirements for the transaction.

As depicted in FIG. 4, steps 405-408 proceed as described above with respect to steps 305-308 of FIG. 3.

III. Additional Embodiments

In some embodiments, advice messages may be generated and sent between the merchant application 101A and the PN SDK 101B. In such embodiments, the advice messages may contain information reasons for rejection (e.g., merchants rejected ordered based on negative files, user order history, website behavior), results of the merchant's review of suspicious orders (e.g., customer communication, email validation, reverse telephone lookup results, credit history check, delivery address vs. billing address), and information regarding non-reported fraud associated with the user that may have been settled.

In some embodiments, advice messages may be generated and sent between the directory server computer 150 and the merchant application 101A. In such embodiments, the advice messages may include risk scores and the detailed portable device information.

In some embodiments, advice messages may be generated and sent between the access control server computer 170 and the merchant application 101A, including risk scores. In such embodiments, the advice messages may be passed to the directory server computer 150 and then to the PN SDK 101B to provide to the merchant application 101A. For example, this may occur during step 306 and 307 in FIG. 3.

In some embodiments, value-added services may be provided to the user prior to the completion of the transaction. For example, an offer may be generated for the transaction prior to the transaction being completed, such as "Get $20 off if you add another pair of jeans to the shopping cart." In addition, risk scores may be provided to the merchants, users, and issuers.

The various participants and elements described herein may operate one or more computer apparatuses to facilitate the functions described herein. Any of the elements in the above-described FIGS. 1-4, including any servers or databases, may use any suitable number of subsystems to facilitate the functions described herein.

As described herein, a computer system may be used to implement any of the entities or components described above. The subsystems of a computer system may be interconnected via a system bus. Additional subsystems such as a printer, keyboard, fixed disk (or other memory comprising computer readable media), monitor, which is coupled to display adapter, and others are also included in embodiments described herein. Peripherals and input/output (I/O) devices, which may be coupled to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk of the computer system may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Embodiments of the invention have a number of advantages. For example, embodiments of the invention allow for increased security for both users and merchants by calculating risk scores that utilize detailed device information for use in authenticating a transaction. The user can engage in transactions without having to provide a large amount of input for authorization as the mobile application of the portable device communicate with other entities to request and obtain the detailed device information. Implementation costs are also reduced as embodiments of the invention can leverage existing communication channels to request and obtain the detailed device information for calculating a risk score in the authentication process. Further, embodiments of the invention enable authentication transactions to adhere to various privacy requirements or concerns on a global scale as the authentication process described herein includes communicating with a rule set or rules database to adhere to privacy requirements regarding detailed device information.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for secure authentication, the method comprising:
receiving, by a server computer from a portable device utilizing a processing network computer SDK and a resource provider application associated with a resource provider computer, an authentication request message for a transaction with the resource provider computer that is being initiated by the portable device utilizing the resource provider application, the resource provider application initiating the secure authentication for the transaction and invoking the processing network computer SDK prior to initiating the secure authentication, the processing network computer SDK being of the portable device and the resource provider application being of the portable device;
receiving, by the server computer, a transaction message including an identifier, user data, portable device data of the portable device, and transaction data for the transaction;
determining, by the server computer, that detailed device information of the portable device is required to authenticate the transaction;
retrieving, by the server computer from a rules database, privacy requirements for the transaction, the privacy requirements limiting the detailed device information retrievable by the server computer;
transmitting, by the server computer to the portable device, a message indicating that a remote server computer is to be accessed by the processing network computer SDK to retrieve the detailed device information, the message including the privacy requirements;
enabling, by the portable device via the processing network computer SDK, the remote server computer to access at least a portion of the detailed device information on the portable device using the identifier and based on the privacy requirements, the at least the portion of the detailed device information including operating system data for the portable device and mobile application data for the portable device;
retrieving, by the server computer from the remote server computer, the at least the portion of the detailed device information using the identifier, based on the privacy requirements;
modifying, by the server computer, the authentication request message to include the at least the portion of the detailed device information retrieved from the remote server computer;
transmitting, by the server computer, the modified authentication request message to an access control server computer, wherein upon receipt, by the access control server computer, of the modified authentication request message, the access control server computer calculates a risk score with respect to the transaction using at least the operating system data for the portable device and the mobile application data for the portable device; and
receiving, by the server computer, an authentication response message from the access control server computer prior to an authorization request message for the transaction being transmitted to an authorizing computer, the authentication response message comprising an indication relating to the risk score, wherein the indication indicates whether the transaction has been authenticated or not, wherein the method further comprises:
if the transaction has been authenticated, receiving, by the server computer, the authentication response message including a verification value for the transaction, as the indication that the transaction has been authenticated, and then transmitting, by the resource provider application, the authorization request message including the verification value to the authorizing computer to authorize the transaction,
otherwise:

if the transaction has not been authenticated, receiving, by the server computer, the authentication response message that does not include the verification value for the transaction, as the indication that the transaction has not been authenticated, generating, by the server computer, an advice message indicating reasons for rejection for the transaction and including the risk score, and transmitting, by the server computer to the resource provider application of the portable device, the advice message, wherein the resource provider computer thereafter terminates the transaction.

2. The method of claim 1, wherein the rules database limits the detailed device information retrieved by the server computer based at least in part on a geographic location associated with the portable device.

3. The method of claim 1, further comprising generating, by the server computer, a session identifier for the transaction.

4. The method of claim 3, wherein the session identifier is stored by the server computer.

5. The method of claim 1, wherein the user data includes one or more of a name of a user, an address for the user, an email address for the user, and a phone number for the user.

6. The method of claim 1, wherein the transaction data identifies item details included in the transaction, payment device data, and a payment account number of a user associated with the transaction.

7. The method of claim 1, wherein the server computer retrieves the privacy requirements based at least in part on a set of rules of the rules database.

8. The method of claim 1, wherein the authentication request message is provided to the server computer in response to a user interacting with a checkout option presented via the resource provider application of the portable device.

9. The method of claim 1, wherein the modifying the authentication request message to include the at least the portion of the detailed device information comprises:
appending the at least the portion of the detailed device information to the authentication request message in a message extension.

10. A computer system for providing secure authentication, the computer system comprising:
a server computer comprising a processor and a memory including instructions that, when executed by the processor, cause the processor to perform a method including the following operations that are indicated as being performed by the processor of the server computer; and
a portable device including a processing network computer SDK, a resource provider application, a processor and a memory including instructions that, when executed by the processor of the portable device, cause the processor of the portable device to perform a method including the following operations that are indicated as being performed by the processor of the portable device:
receiving, by the processor of the server computer from the portable device utilizing the processing network computer SDK and the resource provider application associated with a resource provider computer, an authentication request message for a transaction with the resource provider computer that is being initiated by the portable device utilizing the resource provider application, the resource provider application initiating the secure authentication for the transaction and invoking the processing network computer SDK prior to initiating the secure authentication;

receiving, by the processor of the server computer, a transaction message including an identifier, user data, portable device data of the portable device, and transaction data for the transaction;
determining, by the processor of the server computer, that detailed device information of the portable device is required to authenticate the transaction;
retrieving, by the processor of the server computer from a rules database, privacy requirements for the transaction, the privacy requirements limiting the detailed device information that is retrievable;
transmitting, by the processor of the server computer to the portable device, a message indicating that a remote server computer is to be accessed by the processing network computer SDK to retrieve the detailed device information, the message including the privacy requirements,
upon receiving the message by the portable device, enabling, by the processor of the portable device via the processing network computer SDK, the remote server computer to access at least a portion of the detailed device information on the portable device using the identifier and based on the privacy requirements, the at least the portion of the detailed device information including operating system data for the portable device and mobile application data for the portable device, so that the at least the portion of the detailed device information becomes available for retrieval from the remote server computer by the processor of the server computer;
retrieving, by the processor of the server computer from the remote server computer, the at least the portion of the detailed device information using the identifier, based on the privacy requirements;
modifying, by the processor of the server computer, the authentication request message to include the at least the portion of the detailed device information retrieved from the remote server computer;
transmitting, by the processor of the server computer, the modified authentication request message to an access control server computer, wherein upon receipt, by the access control server computer, of the modified authentication request message, the access control server computer calculates a risk score with respect to the transaction using at least the operating system data for the portable device and the mobile application data for the portable device; and
receiving, by the processor of the server computer, an authentication response message from the access control server computer prior to an authorization request message for the transaction being transmitted to an authorizing computer, the authentication response message comprising an indication relating to the risk score, wherein the indication indicates whether the transaction has been authenticated or not, wherein the method further includes:
if the transaction has been authenticated, receiving, by the processor of the server computer, the authentication response message including a verification value for the transaction, as the indication that the transaction has been authenticated, and then transmitting, by the processor of the portable device using the resource provider application, the authorization request message including the verification value to the authorizing computer to authorize the transaction,
otherwise:

if the transaction has not been authenticated, receiving, by the processor of the server computer, the authentication response message that does not include the verification value for the transaction, as the indication that the transaction has not been authenticated, generating, by the processor of the server computer, an advice message indicating reasons for rejection for the transaction and including the risk score, and transmitting, by the processor of the server computer to the resource provider application of the portable device, the advice message, wherein the resource provider computer thereafter terminates the transaction.

11. A computer-implemented method for secure authentication, the computer-implemented method comprising:

receiving, by a directory server computer from a portable device utilizing a processing network computer SDK and a resource provider application associated with a resource provider computer, an indication for a transaction with the resource provider computer that is being initiated by the portable device utilizing the resource provider application, the resource provider application initiating the secure authentication for the transaction and invoking the processing network computer SDK prior to initiating the secure authentication, the processing network computer SDK being of the portable device and the resource provider application being of the portable device;

generating, by the portable device, a transaction message including an identifier, user data, portable device data of the portable device, and transaction data for the transaction;

transmitting, by the portable device, the transaction message to the directory server computer;

generating, by the portable device, an authentication request message for the transaction;

providing, by the portable device via the processing network computer SDK, the authentication request message to the directory server computer, wherein the directory server computer is configured to determine that detailed device information of the portable device is required to authenticate the transaction;

receiving, by the portable device from the directory server computer, the identifier and an indication that the detailed device information for the portable device is required to authenticate the transaction;

accessing, by the directory server computer, a rules database that identifies privacy requirements for the transaction, the privacy requirements limiting the detailed device information providable to a remote server computer;

enabling, by the portable device via the processing network computer SDK, the remote server computer to access a portion of the detailed device information on the portable device using the identifier and based on the privacy requirements, the at least the portion of the detailed device information including operating system data for the portable device and mobile application data for the portable device;

retrieving, by the directory server computer from the remote server computer, the at least the portion of the detailed device information using the identifier, based on the privacy requirements; and transmitting, by the directory server computer, the authentication request message to an access control server computer, wherein upon receipt, by the access control server computer, of the authentication request message, the access control server computer, prior to an authorization request message for the transaction being transmitted to an authorizing computer, calculates a risk score with respect to the transaction using at least the operating system data for the portable device and the mobile application data for the portable device, and generates an authentication response message including an indication relating to the risk score, wherein the indication indicates whether the transaction has been authenticated or not, wherein the computer-implemented method further comprises:

if the transaction has been authenticated, receiving, by the portable device from the directory server computer, the authentication response message including a verification value for the transaction as the indication that the transaction has been authenticated, and then transmitting, by the portable device via the resource provider application, the authorization request message including the verification value to the authorizing computer to authorize the transaction, otherwise:

if the transaction has not been authenticated, receiving, by the portable device from the directory server computer, the authentication response message that does not include the verification value for the transaction, as the indication that the transaction has not been authenticated, and receiving, by the portable device from the directory server computer, an advice message indicating reasons for rejection for the transaction and including the risk score, wherein the resource provider computer thereafter receives the authentication response message and terminates the transaction.

12. The computer-implemented method of claim 11, wherein the transaction is a request to access data from the resource provider computer.

13. The computer-implemented method of claim 11, wherein the detailed device information includes at least one from among network browser data for the portable device, geo-location data for the portable device, internet protocol address information for the portable device, and language data for the portable device.

14. The computer-implemented method of claim 11, further comprising:

generating an offer associated with the transaction; and
providing the offer for presentation to the portable device prior to completion of the transaction.

15. The computer-implemented method of claim 11, further comprising generating, by the directory server computer, a session identifier for the transaction, wherein the session identifier includes a time stamp that corresponds to the transaction.

* * * * *